April 22, 1952     I. W. GOHDE     2,593,872
FISHING REEL BRAKE
Filed Aug. 6, 1946     4 Sheets-Sheet 1
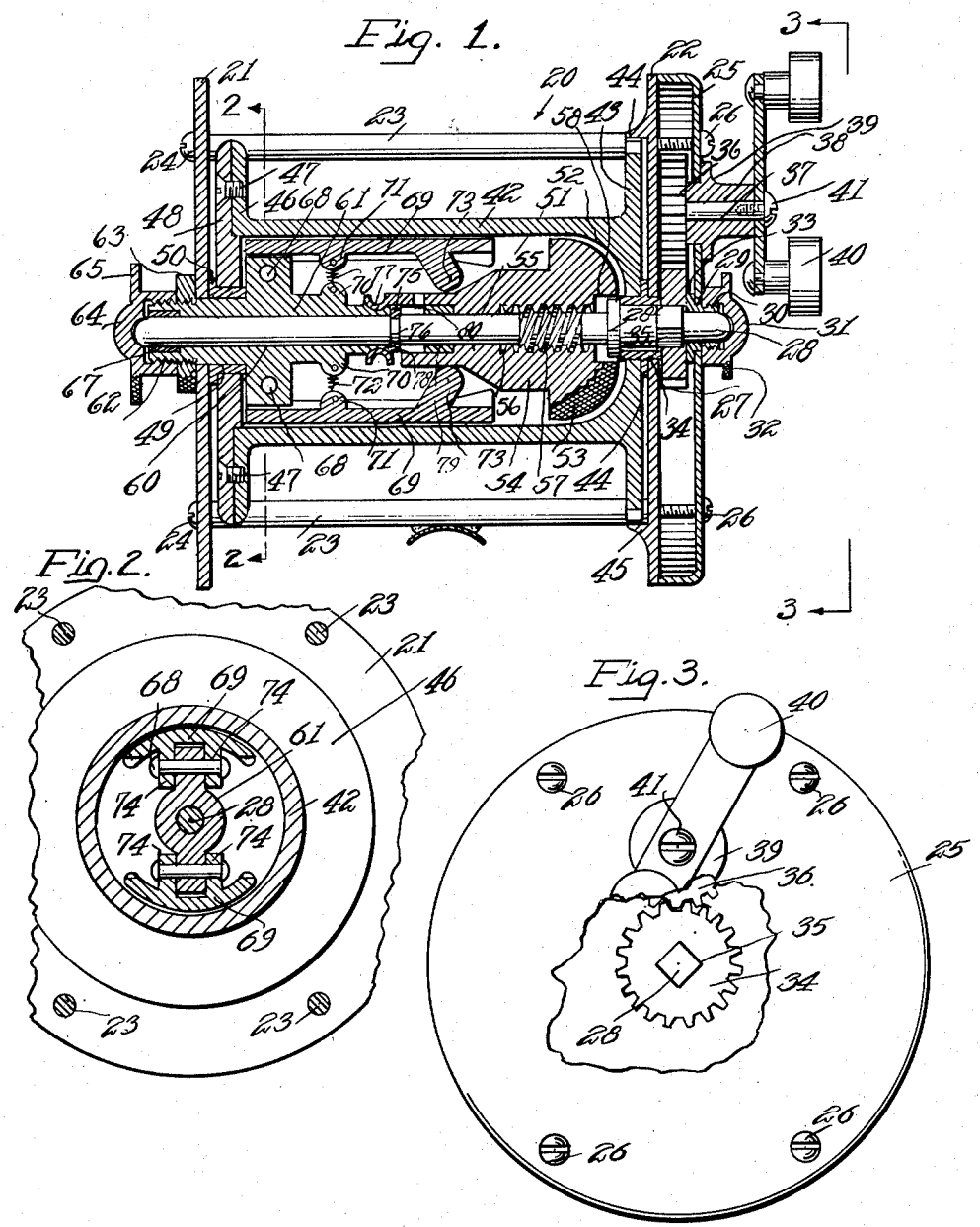
INVENTOR.
IRVING W. GOHDE
BY *Victor J. Evans & Co.*
ATTORNEYS April 22, 1952     I. W. GOHDE     2,593,872
FISHING REEL BRAKE
Filed Aug. 6, 1946     4 Sheets-Sheet 2
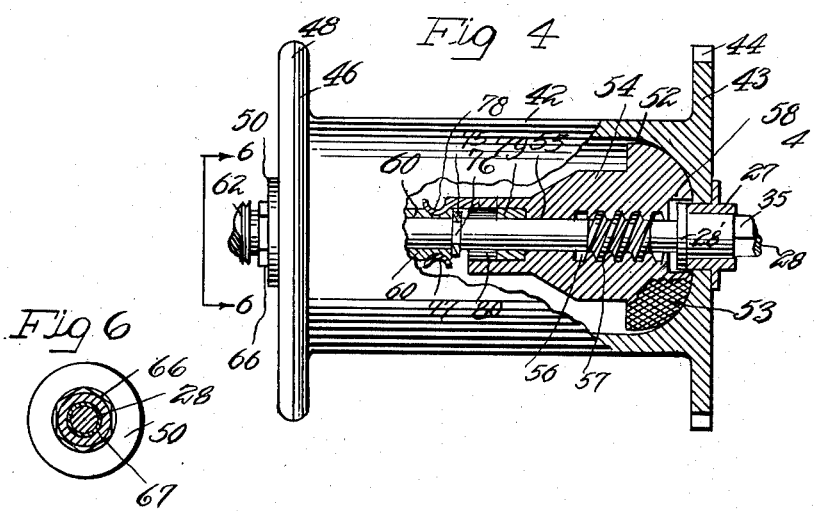
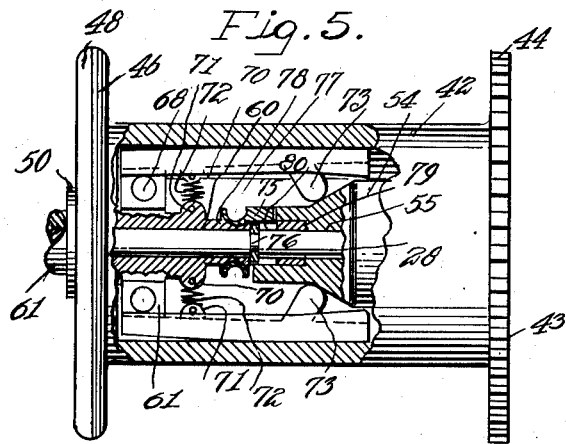
INVENTOR.
IRVING W. GOHDE
BY *Victor J. Evans & Co.*
ATTORNEYS April 22, 1952     I. W. GOHDE     2,593,872
FISHING REEL BRAKE
Filed Aug. 6, 1946     4 Sheets-Sheet 3
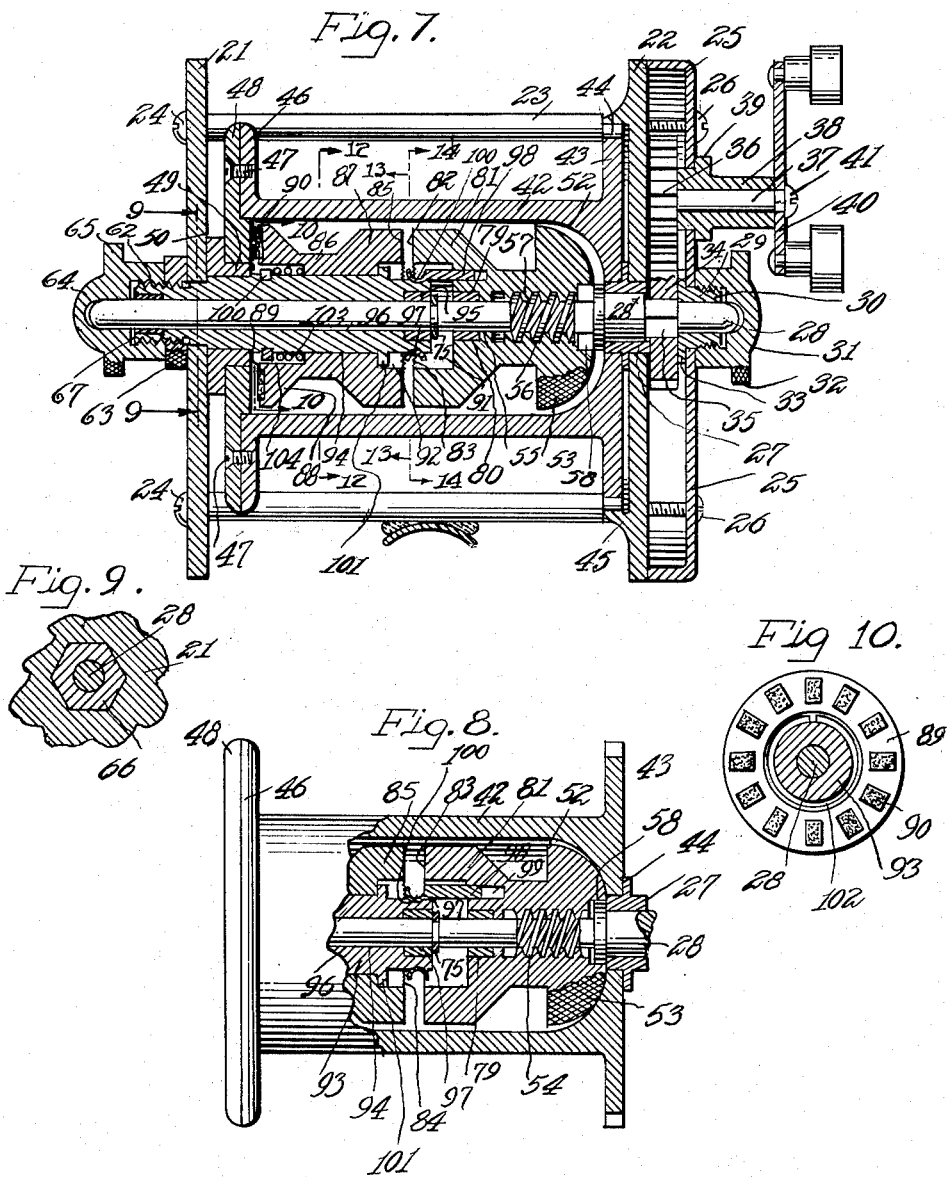
INVENTOR.
IRVING W. GOHDE
BY Victor J. Evans & Co.
ATTORNEYS April 22, 1952     I. W. GOHDE     2,593,872
FISHING REEL BRAKE
Filed Aug. 6, 1946     4 Sheets-Sheet 4
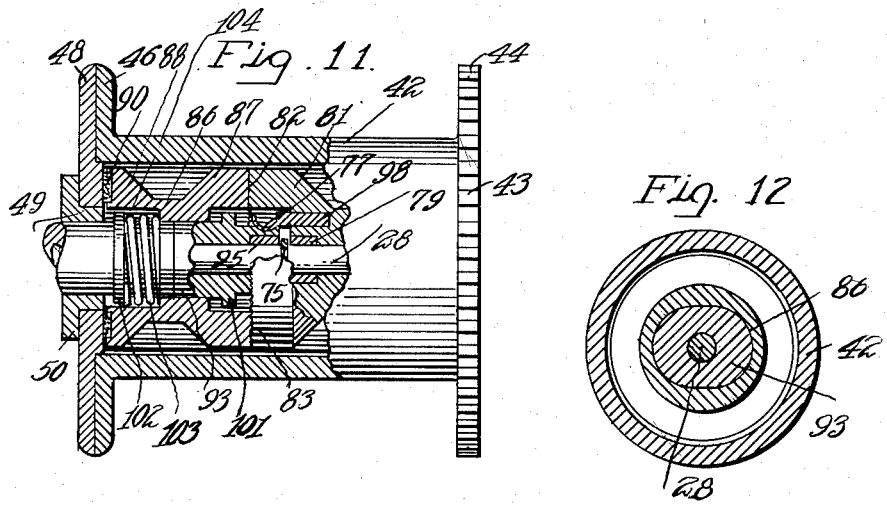
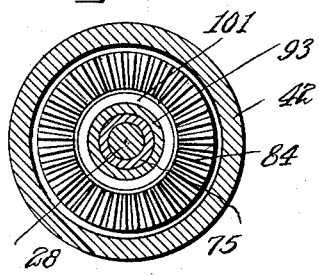
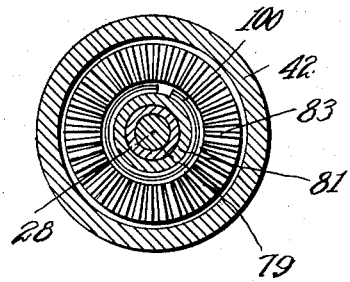
INVENTOR.
IRVING W. GOHDE
BY Victor J. Evans & Co.
ATTORNEYS Patented Apr. 22, 1952

2,593,872

UNITED STATES PATENT OFFICE 2,593,872

FISHING REEL BRAKE

Irving W. Gohde, Chicago, Ill.

Application August 6, 1946, Serial No. 688,757

3 Claims. (Cl. 242—84.5)

This invention relates to fishing reels and more particularly to an improved fishing reel having triple action control.

An object of the invention is to provide a reel having a free-rolling spool independent of the handle during the running of the line, but prevented from rotating by a braking mechanism controlled by the handle.

With the above and other objects in view, the invention consists of the novel details of construction, arrangement and combination of parts more fully hereinafter described, claimed and illustrated in the accompanying drawings in which:

Figure 1 is a cross-sectional view of an embodiment of the invention;

Figure 2 is a sectional view on the line 2—2 of Figure 1;

Figure 3 is an end view on the line 3—3 of Figure 1 partly broken away;

Figure 4 is an elevational view of the spool partly in section at one end thereof;

Figure 5 is the same at the other end thereof;

Figure 6 is a view on the line 6—6 of Figure 4;

Figure 7 is a cross-sectional view of a modified form of the invention;

Figure 8 is an elevational view of the spool shown in Figure 7, partly in section at one end thereof;

Figure 9 is a sectional view on the line 9—9 of Figure 7;

Figure 10 is a sectional view on the line 10—10 of Figure 7;

Figure 11 is a view similar to Figure 8 with the opposite end in section;

Figure 12 is a sectional view on the line 12—12 of Figure 7;

Figure 13 is a sectional view on the line 13—13 of Figure 7 and

Figure 14 is a sectional view on the line 14—14 of Figure 7.

Referring more in detail to the drawings, the reference numeral 20 designates generally the reel embodying the invention which comprises the circular end plates 21 and 22 respectively which are joined in the conventional manner in spaced relation to each other by the rods 23. Plate 21 is secured to the rods by screws 24 while a disk shaped housing 25 is secured to the rods 23 at the opposite ends thereof by screws 26, and the housing 25 engaging the plate 22 retains the plate in relation to the rods since the screws 26 pass through the plate 22 for engagement with the rods 23.

Plate 22 is provided at its center with a bearing 27 for journalling one end of the spool shaft 28 therein while the extreme end of the shaft 28 is journalled in a bearing 29 having a threaded portion 30 for mounting the cap 31 thereon, and the cap is provided with a knurled flange 32 for the adjustment thereof as desired. Bearing 29 is provided with a flange 33 for engagement with the spool pinion 34 mounted on the squared portion 35 of the axle 28 and the pinion meshes with the crankgear 36 on the shaft 37 journalled in the bearing 38 mounted on the housing 25 by the flange 39, and the crank 40 is secured to the shaft 37 by the screw 41 and rotation of the pinion 34 is in the opposite direction with relation to the direction of rotation of the crank 40. The spool 42 is provided with the flange 43 which is mounted on the bearing 27 and spaced from plate 22 by the flange 44 on the bearing 27. The periphery of the flange 45 is toothed at 44 for the actuation of the level wind mechanism, not shown, and an overhanging or flared projection 45 is provided on plate 22 to prevent the line from fouling in the toothed periphery of the flange 43.

The opposite end of the spool 42 is provided with a ring flange 46 to which is secured by screws 47 the circular plate 48, and the plate 48 mounts the spool 42 on the bearing 49 which spaces the plate 48 from plate 21 by means of the flange 50.

The spool 42 is provided with an open end cavity 51 closed at the end by the plate 48, and provided with a concave bottom 52 which is shaped to conform to the knurled convex head 53 of the cone-shaped clutch 54, and the clutch is mounted on the axle 28 by means of the central bore 55, and threads 56 in the bore engage the worm 57 on the shaft 28 whereby the clutch is actuated, and a circular recess 58 in the head 53 receives the thrust collar 28' on the shaft 28, when the head 53 is moved into engagement with the bottom 52 of the cavity 51 as will be later described.

On the opposite end of the shaft 28 is mounted by means of its central bore 60 the brake shoe bracket or brake shoe supporting member 51, and this member is mounted in the bearing 49 and provided with a threaded end 62 to receive the knurled anchoring nut 63 and cap 64 provided with the knurled flange 65 for the adjustment thereof as desired. The member having a hex formation 66 thereon for receiving plate 21 and a bearing 67 for the shaft 28 in the outer end thereof.

Pivotally mounted on the members 61 by pins 68 are the opposed apertured ears 74 of the arcuate shaped brake shoes 69 and apertured ears 70 on the member 61 and apertured ears 71 on the shoes 69 in opposed relation to each other mount compression springs 72 which force the shoe actuators 73 into engagement with the cone clutch 54.

A split washer 75 in the slot 76 in the shaft 28 centers the member 61 with relation to the clutch 54, and a curved spring 77 on the forward end of the clutch engages in the groove 78 in the member 61 for co-action of the clutch and brake shoes as will be later explained, and a bearing 79 in the bore 80 of the clutch mounts this end of the clutch on the shaft 28 and the bore 80 permits movement of the clutch as will be later explained.

During operation of the reel, the spool 42 is free rolling and independent of the gear 36 and hand crank 40 on casting out the line thereon and while line is out in a still fishing position. Upon retrieving the line by turning the crank 40 in a clockwise direction, the head 53 of the clutch 54 is brought into engagement with the concave bottom 52 of the cavity 51 in the spool 42. This movement being caused by means of the engagement of the threads 56 and worm 57. Under freewheeling of the spool, the spring 77 will prevent the clutch 54 from rotating with the spool until the crank is rotated as previously described.

If the spool is unwinding and it is desired to brake the rotation thereof, the hand crank is rotated in a counter-clockwise direction, forcing the clutch in the opposite direction expanding the brake shoes 69 by means of the shoe actuators 73. Upon release of the hand crank, the springs 72 pull the shoes together, releasing the brake by opposite movement of the clutch 54.

In the modified form of the invention shown in Figures 7 to 14 inclusive, the head 53 is provided with a conical shaped head 81 which is provided with flat face 82 having serrations 83 thereon to mate with the complementary shaped serrations 84 on the similarly shaped face 85 of the sliding sleeve 86 having the conical head 87 for the face 85 and the conical head 88 having the flat face 89 in which is embedded the fiber inserts 90.

The head 81 and head 87 are provided with opposed and alined circular recesses 91 and 92 respectively. The bore 91 receiving the forward end of the stationary sleeve 93 on which the sliding sleeve 86 is mounted by means of the central bore 94 and the oval shaped sleeve 93 is mounted on the shaft 28 in a manner similar to the member 61 by the oval bore 96 except that a bearing 95 is provided for the shaft 28 in the forward end of the sleeve 93 which engages the washer 75. A curved spring 97 similar to spring 77 is mounted by means of an arm 98 in the slot 99 in the head 81 and the spring engages the annular groove 100 in the sleeve 93. A flange 101 engages the bottom of the recess 92 to limit movement of the sleeve 86 in one direction and a split washer 102 seated on the sleeve 93 engages one end of a coil spring 103 which is seated in the recess 104 formed in the head 88 of the sleeve 86 and the spring forces the face 89 out of engagement with the plate 48.

During operation of the modified form of the invention, which is similar to that previously described, except that the head 87 is forced against the plate 48 for the braking action of the spool by the rotation of the hand crank.

Thus a reel has been provided with a free wheeling spool which may be actuated for the rewinding thereof or the braking thereof.

It is believed that from the foregoing description, the construction and operation of the invention will be apparent to those skilled in the art, and it is to be understood that changes in the details of construction, arrangement and combination of parts may be resorted to, provided they fall within the spirit of the invention and the scope of the appended claims.

Having thus described the invention, what is claimed as new and desired to be obtained by Letters Patent is:

1. A device of the character described, comprising a reel having circular end plates, rods joining said end plates in spaced relation to each other, a free running spool, a shaft for said spool journalled in said end plates, a worm on said shaft adjacent one end thereof, a cone shaped actuating member having internal threads mounted on said shaft so that said threads coact with said worm, a brake shoe supporting member on said shaft opposite to said actuating member, brake shoes pivoted on said supporting member and extending within said spool parallel to said shaft, shoe actuators on said brake shoes extending toward said shaft, springs connected to said shoes and said supporting member to urge said shoes toward said shaft, a hand crank for said reel member on one of said end plates, said actuating member being arranged to engage said shoe actuators for applying said brake shoes to said spool for braking said spool during the rotation thereof, said actuating member being operated by said hand crank.

2. The invention as in claim 1 wherein means is provided in said spool for co-action with said hand crank whereby said spool is rotated after the cast.

3. The invention as in claim 1 wherein coacting means is provided on said supporting member and said actuating member for retaining said actuating member inactive during the free running of the spool.

IRVING W. GOHDE.

REFERENCES CITED

The following references are of record in the file of this patent:

UNITED STATES PATENTS

| Number | Name | Date |
| --- | --- | --- |
| 1,145,038 | Schramm | July 6, 1915 |
| 2,246,191 | Schmitz | June 17, 1941 |
| 2,257,023 | Ray | Sept. 23, 1941 |
| 2,271,883 | Bannister | Feb. 3, 1942 |
| 2,489,964 | Hood | Nov. 29, 1949 |